Aug. 24, 1965     W. L. DOLLENMAYER     3,203,000
MARKING DEVICE FOR DICTATING MACHINE
Filed Dec. 20, 1963     3 Sheets-Sheet 1
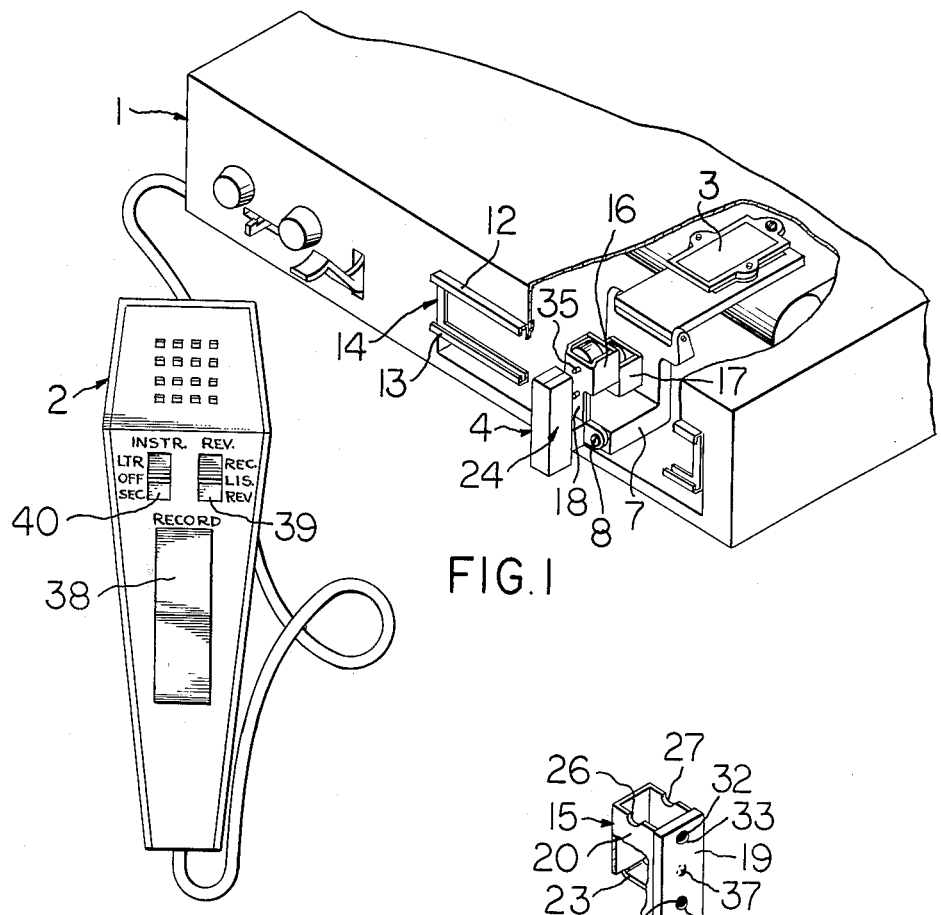
FIG. 1
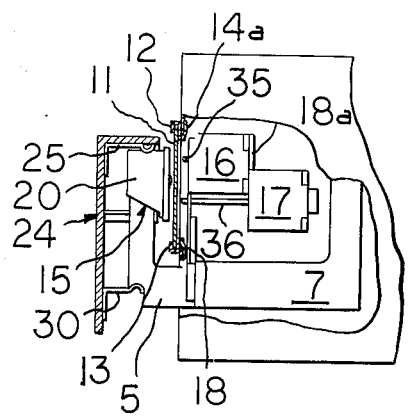
FIG. 2
FIG. 3
INVENTOR.
WILLIAM L. DOLLENMAYER
BY Frank C. Leach jr.
HIS ATTORNEY Aug. 24, 1965      W. L. DOLLENMAYER      3,203,000
MARKING DEVICE FOR DICTATING MACHINE
Filed Dec. 20, 1963                     3 Sheets-Sheet 2
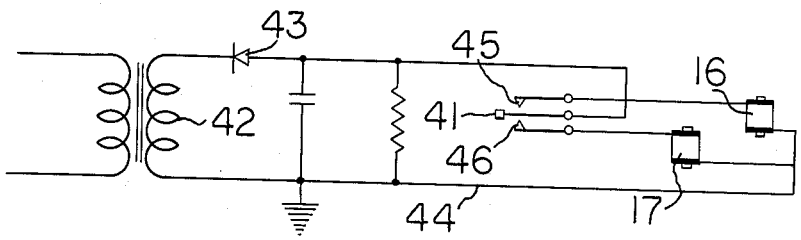
FIG. 4
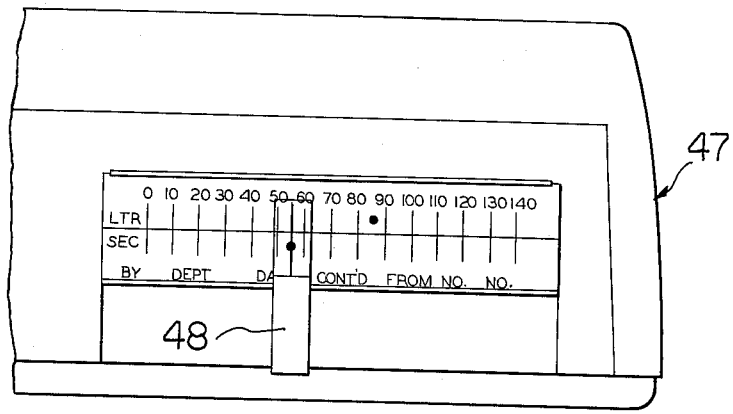
FIG. 5
FIG. 6

Aug. 24, 1965   W. L. DOLLENMAYER   3,203,000
MARKING DEVICE FOR DICTATING MACHINE
Filed Dec. 20, 1963   3 Sheets-Sheet 3
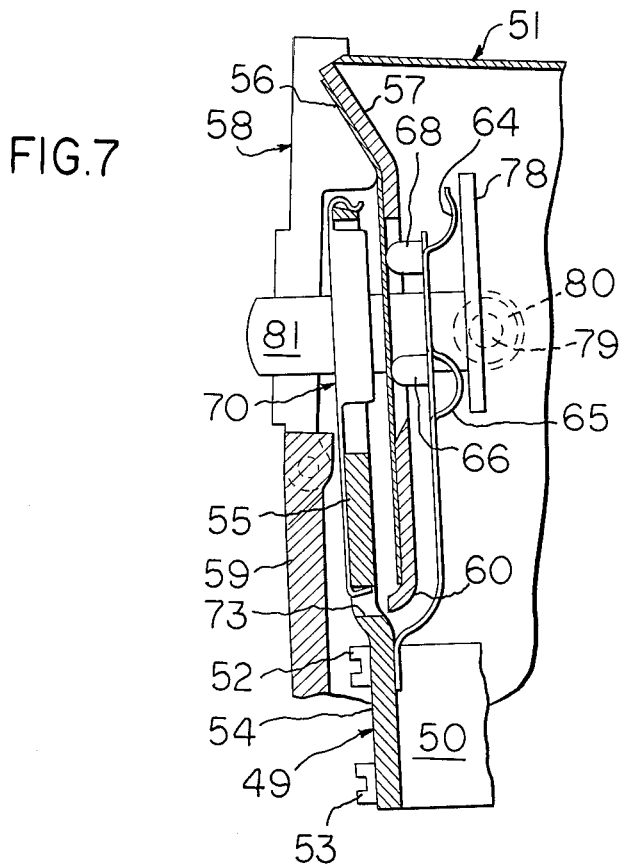
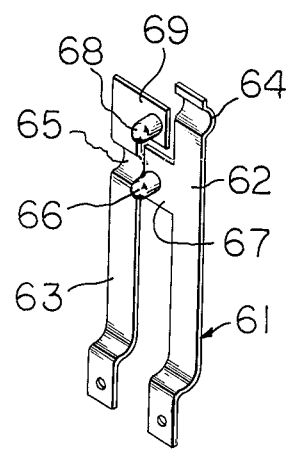

United States Patent Office 3,203,000
Patented Aug. 24, 1965

3,203,000
MARKING DEVICE FOR DICTATING MACHINE
William L. Dollenmayer, Lexington, Ky., assignor to International Business Machines Corporation, New York, N.Y., a corporation of New York
Filed Dec. 20, 1963, Ser. No. 332,178
5 Claims. (Cl. 346—50)

This invention relates to a dictating machine and, more particularly, to a device for marking an index strip of a dictating machine.

In order that the transcriber of material recorded on a dictating machine may know when corrections are made in the dictated material or when a specific portion or all of the dictated material ends, an index strip is employed with the dictating machine. The dictator actuates a suitable mechanism to mark the index strip whenever there is a correction in the dictated material or the end of a portion or all of the dictated material occurs.

Various structures have been employed to mark index strips of dictating machines. One type of marking device has utilized a punch to make a hole in the index strip to indicate to the transcriber that there is a correction in the dictated material, for example. However, the use of a punch creates several problems. One of these is that a substantial amount of power is required for the punch to penetrate the index strip. Another problem is that index strips cannot be stored on the dictating machine because the punch goes completely through the index strip. A further problem due to the use of a punch is that the punched material, which is called chad, collects around the dictating machine.

The present invention satisfactorily solves the foregoing problems by using the combination of an ink pad and a plunger to mark the index strip. Of course, this eliminates the chad and also permits the storage of a number of index strips on the dictating machine. Furthermore, the device of the present invention requires much less power than a punch type indicating device; of course, this reduces the size of the power generating components.

Another type of device for marking an index strip is a stylus or pencil. However, a pencil or stylus wears down and ceases to make a sharp image on the index strip. Furthermore, whenever the index strip is to be marked in separate spaced planes, a pair of pencils must be employed rather than a single pencil. In order to use two pencils, a complicated mechanism is required to insure that only one of the two pencils makes a mark in each of the separate horizontal planes.

The ink pad and plunger combination of the present invention satisfactorily solves the foregoing problems resulting from the use of a pencil or stylus. Since the ink pad of the present invention provides the mark rather than the plunger, there is no wearing down of the marking device as with the pencil or stylus. Furthermore, the present invention employs a single structure to permit marking of the index strip in two horizontal planes so that a complicated mechanism, which is needed when two pencils are utilized, is not required.

An object of this invention is to provide a device for marking an index strip used with dictating equipment.

Another object of this invention is to provide a unitary assembly for marking an index strip of a dictating equipment.

The foregoing and other objects, features, and advantages of the invention will be apparent from the following more particular description of preferred embodiments of the invention, as illustrated in the accompanying drawings.

In the drawings:

FIG. 1 is a perspective view of a portion of a dictating machine including the marking device of the present invention with the index strip omitted for clarity purposes.

FIG. 2 is a sectional view of a portion of the structure of FIG. 1 with the index strip added and the marking device of the present invention shown in elevation.

FIG. 3 is a perspective view of the portion of the marking device having the ink pad disposed thereon.

FIG. 4 is a plan view of one type of index strip that may be employed with the present invention.

FIG. 5 is a schematic wiring diagram utilized in actuating the marking device of the present invention.

FIG. 6 is an elevational view of a portion of a transcribing machine including a marked index strip.

FIG. 7 is a sectional view of another embodiment of the marking device of the present invention.

FIG. 8 is a perspective view of a portion of the structure of FIG. 7.

FIG. 9 is a perspective view of the ink pad structure employed with the modification of FIG. 7.

Referring to the drawings and particularly FIG. 1, there is shown a dictating machine 1 having a microphone 2 and a recording head 3. A marking device 4 is attached to the recording head 3 for movement therewith.

The marking device 4 includes a base or bracket 5 having a pair of apertured ears 6. The base 5 of the marking device 4 is secured to a bracket 7 on the recording head 3 by suitable means such as screws 8 or the like extending through the apertured ears 6 into the bracket 7.

The base 5 of the marking device 4 has portions 9 and 10 extending upwardly therefrom and disposed on opposite sides of an index strip 11 (see FIG. 2), which is held on the front of the dictating machine 1 by flanges 12 and 13 on a member 14 disposed with an opening in the dictating machine 1. The member 14 is secured to the dictating machine 1 by suitable means such as tabs 14a.

An ink cartridge 15 is mounted on the portion 9 of the marking device 4 in front of the index strip 11. Solenoids 16 and 17 are supported by the portion 10 of the marking device 4 at the rear of the index strip 11.

As shown in FIG. 2, the solenoid 16 has a depending flange 18 secured by suitable means such as rivets to the portion 10. The solenoid 17 has an upstanding bracket 18a, which is held by suitable means such as screws or the like to the rear of the solenoid 16.

The ink cartridge 15 includes a housing 19 and a support 20. The support 20 is adapted to fit over spaced arms 21 and 22 of the portion 9 of the marking device 4. The support includes a guide member 23, which slides between the spaced arms 21 and 22 and abuts against the connection of these two spaced arms to position the ink cartridge 15 vertically.

The ink cartridge 15 and the portion 9 of the marking device 4 are enclosed within a casing 24 that permits the marking device to be readily grasped by the operator. The casing 24 has a finger 25 with a curved end for cooperation with curved slots 26 and 27 in the tops of spaced walls of the support 20. The spaced arms 21 and 22 have curved slots 28 and 29 to accommodate the curved end of the finger 25. The casing 24 has a second finger 30 with a curved end for cooperation with a curved slot 31 in the lower surface of the portion 9 of the marking device 4 adjacent the base 5.

The finger 30 of the casing 24 is resiliently biased. This permits the casing 24 to be easily attached by placing the curved end of the finger 25 in the curved slots 26, 27, 28, and 29 and then overcoming the resilient force of the finger 30 to move it into the curved slot 31. The casing 24 also insures that the ink cartridge 15 remains in position with the guide member 23 abutting against the connection of the spaced arms 21 and 22.

The housing 19 has an ink pad or member 32 disposed therein and supported thereby. While any type of ink pad may be employed, the ink pad 32 is preferably a micro-porous vinyl ink-supply roll. One type of roll is sold by S. C. Johnson and Son, Inc., Racine, Wisconsin, under the trademark of Porelon. The use of an ink member such as Porelon provides a longer life for the ink pad 32. The housing 19 has two spaced apertures or openings 33 and 34 through which the ink pad 32 is exposed to the exterior of the housing 19.

With the guide 23 of the ink cartridge 15 abutting against the connection of the spaced arms 21 and 22 due to the casing 24, the housing 19 is positioned with the opening 33 disposed opposite an "LTR" portion of the index strip 11 (see FIG. 4). The opening 34 is located in the housing 19 opposite an "SEC" portion of the index strip 11 when the casing 24 holds the guide 23 in engagement with the connection of the spaced arms 21 and 22.

The solenoids 16 and 17 are mounted on the portion 10 of the marking device 4 so that a plunger 35 of the solenoid 16 is in alignment with the opening 33 in the housing 19 and a plunger 36 of the solenoid 17 is in alignment with the opening 34 in the housing 19. Thus, when the solenoid 16 is energized, the plunger 35 moves the index strip 11 into contact with the portion of the ink pad 32 exposed by the opening 33 to mark the "LTR" portion of the index strip 11. Similarly, when the solenoid 17 is energized, the plunger 36 moves the index strip 11 into engagement with the portion of the ink pad 32 exposed by the opening 34 to mark the "SEC" portion of the index strip.

In order to prevent any smudging of the index strip 11 when it is moved into contact with one of the exposed portions of the ink pad 32, a projection 37 is positioned on the housing 19 between the spaced openings 33 and 34. The projection 37 insures that engagement is made by the index strip 11 with only the desired exposed portion of the ink pad 32.

The microphone 2 of the dictating machine 1 includes a number of controls. These include a record slide 38, a record-listen-review button 39, and an instruction marking button 40. The button 40 may be moved from its "OFF" position to an "LTR" position or an "SEC" position. When the button 40 is moved to the "LTR" position, the solenoid 16 is energized whereby the plunger 35 engages the index strip 11. This moves the index strip 11 into contact with the portion of the ink pad 32 exposed by the opening 33 to mark the "LTR" portion of the index strip 11. Similarly, when the button 40 is moved to the "SEC" position, the solenoid 17 is energized whereby the plunger 36 engages the index strip 11. This moves the index strip 11 into contact with the portion of the ink pad 32 exposed by the opening 34 to mark the "SEC" portion of the index strip 11.

The wiring circuit used to energize the solenoids 16 and 17 is schematically shown in FIG. 5. The button 40 includes a switch 41, which is shown in its "OFF" position in FIG. 5. The switch 41 is connected to one side of a transformer winding 42 through a rectifier 43. The other end of the transformer winding 42 is connected by a conductor 44 to the solenoids 16 and 17. The other ends of the solenoids 16 and 17 are connected to contacts 45 and 46, respectively.

When the switch 41 is moved upwardly due to the button 40 being moved to its "LTR" position, an electrical circuit is completed through the solenoid 16 to move the plunger 35 into contact with the index strip 11. Similarly, if the button 40 is moved downwardly to its "SEC" position, the switch 41 engages the contact 46 to complete an electrical circuit through the solenoid 17 to move the plunger 36 into engagement with the index strip 11. While the solenoids 16 and 17 are disclosed as being operated by direct current, it should be understood that the solenoids could be of the alternating current type, if desired.

Considering the operation of the present invention, the marking device 4 always moves with the recording head 3 so that it is always positioned to mark the index strip 11 at the exact time when the letter is ended, for example, or an error occurs. As shown in FIG. 4, the index strip 11 is divided into time segments extending from 0 to 140.

If the operator of the dictating machine 1 makes an error, the button 40 is moved from its "OFF" position to its "SEC" position. This causes engagement between the switch 41 and the contact 46 to energize the solenoid 17. As a result, the plunger 36, which is resiliently biased away from the index strip 11 by means within the housing of the solenoid 17, overcomes the resilient means and moves into engagement with the index strip 11. Since the plunger 36 is aligned with the opening 34, the index strip 11 moves into contact with the portion of the ink pad 32 exposed by the opening 34. As previously set forth, the opening 34 is disposed in alignment with the "SEC" portion of the index strip 11. Thus, an ink mark appears on the "SEC" portion of the index strip at the time that the error has occurred. It should be understood that the momentum of the plungers 35 and 36 contribute to printing of the marks on the index strip 11.

Similarly, when a letter or other material is finished, the button 40 is moved to the "LTR" position whereby the switch 41 engages the contact 45. This results in energization of the solenoid 16 to move the plunger 35, which is resiliently biased away from the index strip 11 by means within the housing of the solenoid 16, into engagement with the index strip 11. Since the plunger 35 is in alignment with the opening 33, the index strip 11 moves into contact with the portion of the ink pad 32 exposed by the opening 33. As previously set forth, the opening 33 is in alignment with the "LTR" portion of the index strip 11 so that the "LTR" portion of the index strip 11 is marked when the solenoid 16 is energized.

When the operator of the dictating machine 1 has finished dictating, the recording member such as a belt or disc is removed from the dictating machine along with the index strip 11. The person, who will transcribe the dictated material, places the index strip 11 on the front of a transcribing machine 47 (see FIG. 6). The transcribing machine 47 has an indicator 48, which moves with the transcribing head, to illustrate to the transcriber when an error occurs in the dictating or when a letter is completed. As shown in FIG. 6, the indicator 48 is positioned at an error while completion of the dictated material appears between "80" and "90."

A modification of the present invention is shown in FIGS. 7–9. In this arrangement, the marking mechanism is actuated manually rather than electrically.

Referring to FIG. 7, there is shown a marking device 49 attached to a recording head 50 of a dictating machine 51 by suitable means such as screws 52 and 53. It should be understood that there are at least two of each of the screws 52 and 53 spaced from each other in the same horizontal plane. The marking device 49 includes a base 54 having a portion 55 extending upwardly on the front side of an index strip 56, which is the same as the index strip 11 of the modification of FIGS. 1–6.

The upper portion of the index strip 56 is held between a wall 57 of the dictating machine 51 and a member 58, which is pivotally connected to another wall 59 of the dictating machine 51. The wall 57 terminates in spaced tabs or flanges 60 against which the bottom of the index strip 56 abuts.

As shown in FIG. 8, a spring and plunger assembly 61 includes a pair of spaced resiliently biased arms 62 and 63. Each of the arms 62 and 63 is secured to the base 54 of the marking device 49 by one of the spaced screws 52 and extends to the rear of the index strip 56 (see FIG. 7).

The arm 62 has a curved projection 64 disposed higher than a curved projection 65 on the arm 63. A plunger 66 is secured to a bracket 67 on the arm 62 beneath the projection 64. A plunger 68 is secured to a bracket 69 on the arm 63 above both the plunger 66 and the projection 65.

An ink cartridge 70 is held on the portion 55 of the base 54 by spring biased ends 71 and 72 fitting over the top of the portion 55 and within an opening 73 of the portion 55, respectively. As shown in FIG. 9, the ink cartridge 70 includes a housing 74 having a pair of spaced apertures or openings 75 and 76. An ink pad 77 is disposed within the housing 74 and has its portions exposed to the exterior of the housing 74 by the openings 75 and 76.

The spring and plunger assembly 61 is mounted with the plunger 68 in alignment with the opening 75 in the housing 74 and the plunger 66 in alignment with the opening 76 in the housing 74. The ink cartridge 70 is positioned on the portion 55 with the opening 75 disposed opposite the "LTR" portion of the index strip 56 and the opening 76 disposed opposite the "SEC" portion of the index strip 56.

Thus, whenever the arm 63 is actuated, the plunger 68 moves the "LTR" portion of the index strip 56 into engagement with the portion of the ink pad 77 exposed by the opening 75 to mark the "LTR" portion of the index strip 56. Similarly, when the arm 62 is actuated, the plunger 66 moves the "SEC" portion of the index strip 56 into engagement with the portion of the ink pad 77 exposed by the opening 76 to mark the "SEC" portion of the index strip 56.

The actuating mechanism for the resiliently biased arms 62 and 63 of the spring and plunger assembly 61 includes a bail 78, which is secured to a shaft 79. The shaft 79 is supported by bearings 80 (one shown) in opposite end walls of the dictating machine 51. An actuating arm 81 is secured to one end of the shaft 79 to rotate the shaft 79 to move the plungers 66 and 68 into engagement with the index strip 56.

The movement of the actuating arm 81 toward the "LTR" portion of the index strip 56 results in clockwise movement (as viewed in FIG. 7) of the shaft 79. This moves the lower portion of the bail 78 into engagement with the projection 65 to move the resiliently biased arm 63. This causes the plunger 68 to move the "LTR" portion of the index strip 56 into engagement with the portion of the ink pad 77 exposed by the opening 75.

When the actuating arm 81 is moved toward the "SEC" portion of the index strip 56, the shaft 79 rotates counterclockwise (as viewed in FIG. 7) whereby the upper end of the bail 78 is moved into engagement with the projection 64 on the arm 62. This results in the plunger 66 moving the "SEC" portion of the index strip 56 into engagement with the portion of the ink pad 77 exposed by the opening 76. Accordingly, the normal movement of the actuating arm 81 by the operator produces the mark on the desired portion of the index strip 56.

It should be noted that the upper portion of the bail 78 extends a substantially greater distance from the center of the shaft 79 than the lower portion. This is because a greater displacement is required to overcome the spring force of the arm 62 than the spring force of the arm 63 due to the greater distance of the projection 64 from the connection to the base 54 than the projection 65.

In order to insure that only the "LTR" or "SEC" portion of the index strip 56 moves into engagement with the exposed portion of the ink pad 77, the housing 74 has a projection 82 between the spaced openings 75 and 76 as shown in FIG. 9.

An advantage of this invention is that the electrically operated structure of the modification of FIGS. 1–6 may be tested prior to installation on the dictating machine. Another advantage of this invention is that the ink pad may be easily replaced without removing the marking device from the dictating machine. A further advantage of this invention is that its cost is substantially low in comparison with other marking devices used with dictating machines. Still another advantage of this invention is that it is much smaller in size in comparison with marking devices currently used on dictating machines. A still further advantage of this invention is that its weight is substantially smaller than the marking devices presently employed on dictating machines.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a dictating machine having an index strip supported thereon and a recording head; an apparatus for marking the index strip, said apparatus including:
  a bracket attached to said recording head for movement therewith;
  said bracket having a first portion disposed on one side of the index strip and a second portion disposed on the other side of the index strip;
  a housing mounted on said first portion;
  said housing having at least one opening in one wall thereof;
  an ink member disposed within said housing and having a portion exposed to the exterior of said housing by said opening;
  and means to move the index strip into contact with the portion of said ink member exposed by said opening to mark the index strip, said means being mounted on said second portion of said bracket.

2. In a dictating machine having an index strip supported thereon and a recording head; an apparatus for marking spaced portions of the index strip, said apparatus including:
  a bracket attached to said recording head for movement therewith;
  said bracket having a first portion disposed on one side of the index strip and a second portion disposed on the other side of the index strip;
  a housing mounted on said first portion;
  said housing having two spaced openings in one wall thereof;
  an ink member disposed within said housing and having portions exposed to the exterior of said housing by said openings;
  means to move a first portion of the index strip into contact with the portion of said ink member exposed by one of said openings to mark the first portion of the index strip, said means being mounted on said second portion of said bracket;
  and means to move a second portion of the index strip, spaced from the first portion of the index strip, into contact with the portion of said ink member exposed by the other of said openings to mark the second portion of the index strip, said means being mounted on said second portion of said bracket.

3. In a dictating machine having an index strip supported thereon and a recording head; an apparatus for marking spaced portions of the index strip, said apparatus including:
  a bracket attached to said recording head for movement therewith;
  said bracket having a first portion disposed on one side of the index strip and a second portion disposed on the other side of the index strip;
  a housing mounted on said first portion;
  said housing having two spaced openings in one wall thereof;
  an ink member disposed within said housing and having portions exposed to the exterior of said housing by said openings;
  means to move a first portion of the index strip into contact with the portion of said ink member exposed by one of said openings to mark the first portion of the index strip, said means being mounted on said second portion of said bracket;

means to move a second portion of the index strip, spaced from the first portion of the index strip, into contact with the portion of said ink member exposed by the other of said openings to mark the second portion of the index strip, said means being mounted on said second portion of said bracket;

and said housing having a projection disposed between said openings and extending from said one wall thereof to prevent accidental contact between the index strip and said exposed portions of said ink member.

4. In a dictating machine having an index strip supported thereon and a recording head; an apparatus for marking spaced portions of the index strip, said apparatus including:

a bracket attached to said recording head for movement therewith;

said bracket having a first portion disposed on one side of the index strip and a second portion disposed on the other side of the index strip;

a housing removably mounted on said first portion;

said housing having two spaced openings in one wall thereof;

an ink member disposed within said housing and having portions exposed to the exterior of said housing by said openings;

means to move a first portion of the index strip into contact with the portion of said ink member exposed by one of said openings to mark the first portion of the index strip, said means being mounted on said second portion of said bracket;

and means to move a second portion of the index strip, spaced from the first portion of the index strip, into contact with the portion of said ink member exposed by the other of said openings to mark the second portion of the index strip, said means being mounted on said second portion of said bracket.

5. In a dictating machine having an index strip supported thereon and a recording head; an apparatus for marking spaced portions of the index strip, said apparatus including:

a bracket attached to said recording head for movement therewith;

said bracket having a first portion disposed on one side of the index strip and a second portion disposed on the other side of the index strip;

a housing mounted on said first portion;

said housing having two spaced openings in one wall thereof;

an ink member disposed within said housing and having portions exposed to the exterior of said housing by said openings;

a pair of spaced resiliently biased plungers mounted on said second portion of said bracket;

one of said pair of resiliently biased plungers adapted to move a first portion of the index strip into contact with said portion of the ink member exposed by one of said openings to mark the first portion of the index strip;

the other of said pair of resiliently biased plungers adapted to move a second portion of the index strip, spaced from the first portion of the index strip, into contact with said portion of the ink member exposed by the other of said openings to mark the second portion of the index strip;

and means to actuate said plungers.

References Cited by the Examiner

UNITED STATES PATENTS

| 923,287 | 6/09 | Messick | 346—40 |
| 1,296,305 | 3/19 | Mehren | 346—140 |
| 2,843,386 | 7/58 | Stanton et al. | 346—111 X |
| 2,992,060 | 7/61 | Roberts | 346—76 |

LEO SMILOW, *Primary Examiner.*